(12) United States Patent
Kawaguchi (10) Patent No.: US 8,218,089 B2
(45) Date of Patent: Jul. 10, 2012

(54) VIDEO SIGNAL PROCESSING APPARATUS, VIDEO SIGNAL PROCESSING METHOD, AND PROGRAM

(75) Inventor: Takayoshi Kawaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 521 days.

(21) Appl. No.: 12/534,404

(22) Filed: Aug. 3, 2009

(65) Prior Publication Data

US 2010/0026900 A1 Feb. 4, 2010

(30) Foreign Application Priority Data

Aug. 4, 2008 (JP) ................................ P2008-201009

(51) Int. Cl.
*H04N 5/52* (2006.01)

(52) U.S. Cl. ........ 348/678; 348/607; 348/687; 348/627; 348/255; 382/275

(58) Field of Classification Search .................. 348/678, 348/255, 607, 608, 685, 687, 673, 627; 382/275, 382/274

See application file for complete search history.

(56) References Cited

U.S. PATENT DOCUMENTS

| 6,040,860 A * | 3/2000 | Tamura et al. ................ 348/252 |
| 7,773,158 B2 * | 8/2010 | Yamashita et al. ............ 348/678 |
| 7,948,563 B2 * | 5/2011 | Sono ............................. 348/687 |

* cited by examiner

*Primary Examiner* — Jefferey Harold
*Assistant Examiner* — Jean W Desir
(74) *Attorney, Agent, or Firm* — Frommer Lawrence & Haug LLP; William S. Frommer; Thomas F. Presson (57) ABSTRACT

A video signal processing apparatus includes: a gain inverse correction means for giving an inverse correction gain resulting in an inverse correction characteristic to a gain to a video signal subjected to automatic gain control and outputting the video signal; a texture component removing means for removing a texture component from the video signal output from the gain inverse correction means; a gain inverse-inverse correction means for giving an inverse-inverse correction gain to the video signal output from the texture component removing means; a texture component extracting means for extracting a texture component signal, utilizing the video signal output by the gain inverse correction means and the video signal output by the texture component removing means; and a signal synthesizing means for synthesizing a structure component signal based on the video signal output by the gain inverse-inverse correction means and the texture component signal to output a video signal.

5 Claims, 4 Drawing Sheets

VIDEO SIGNAL PROCESSING APPARATUS, VIDEO SIGNAL PROCESSING METHOD, AND PROGRAM

BACKGROUND OF THE INVENTION

1. Field of the Invention

The present invention relates to a video signal processing apparatus and a method thereof for performing signal processing of video signal. The invention also relates to a program executed by the video signal processing apparatus.

2. Description of Related Art

As disclosed in JP-A-11-69202, removal of noise from video signal is performed as one of video signal processing.

SUMMARY OF THE INVENTION

However, noise removal for video signal cannot yield good image quality unless the noise removal is performed appropriately according to the condition of the video signal to be processed. Accordingly, it is desirable to provide an appropriate noise removal operation suitable for the condition of the video signal, particularly for the gain obtained by automatic gain control.

In view of the foregoing and other problems, the invention provides, as an embodiment, a video signal processing apparatus as follows.

The video signal processing apparatus includes: gain inverse correction means for receiving a video signal having been subjected to automatic gain control and gain information indicating a gain set by the automatic gain control, giving an inverse correction gain resulting in a correction characteristic that is inverse to the gain indicated by the gain information to received input video signal, and outputting the video signal; a texture component removing means for removing a texture component from the video signal that is output from the gain inverse correction means; a gain inverse-inverse correction means for giving an inverse-inverse correction gain resulting in a correction characteristic that is inverse to the inverse correction gain to the video signal that is output from the texture component removing means; a texture component extracting means for extracting a texture component signal, utilizing the video signal that is output by the gain inverse correction means and the video signal that is output by the texture component removing means; and a signal synthesizing means for synthesizing a structure component signal based on the video signal that is output by the gain inverse-inverse correction means and the texture component signal to output a video signal.

In the above-described configuration, first, a video signal subjected to automatic gain control is input to the apparatus, and the noise generated by the automatic gain control is suppressed to the strength before the automatic gain control by giving the video signal a correction characteristic that is inverse to the correction characteristic of the automatic gain control (i.e., by performing an inverse correction). Next, this video signal that has undergone the inverse correction is separated into a video signal component (structure component), from which noise is removed, and a noise component (texture component). Further, a correction characteristic that is inverse to the inverse correction is given to the structure component. Thereby, a video signal that has the same level of brightness as that subjected to the automatic gain control and from which noise is appropriately removed is obtained. Next, the structure component and the texture component are resynthesized with each other to regenerate the video signal. In the video signal regenerated in this way, noise is reduced to an appropriate strength according to the gain provided by the automatic gain control.

Thus, the embodiment of invention achieves video signal processing that enables noise removal at an appropriate strength at all times suitable for the gain set by automatic gain control.

DESCRIPTION OF THE PREFERRED EMBODIMENTS

Hereinbelow, an embodiment of the invention will be described in accordance with the following order.
1. Overall configuration
2. An example of the basic configuration of a video signal processing unit that forms the basis of the embodiment
3. An example of the configuration of a video signal processing unit as an embodiment <1. Overall Configuration>

Figure 1:
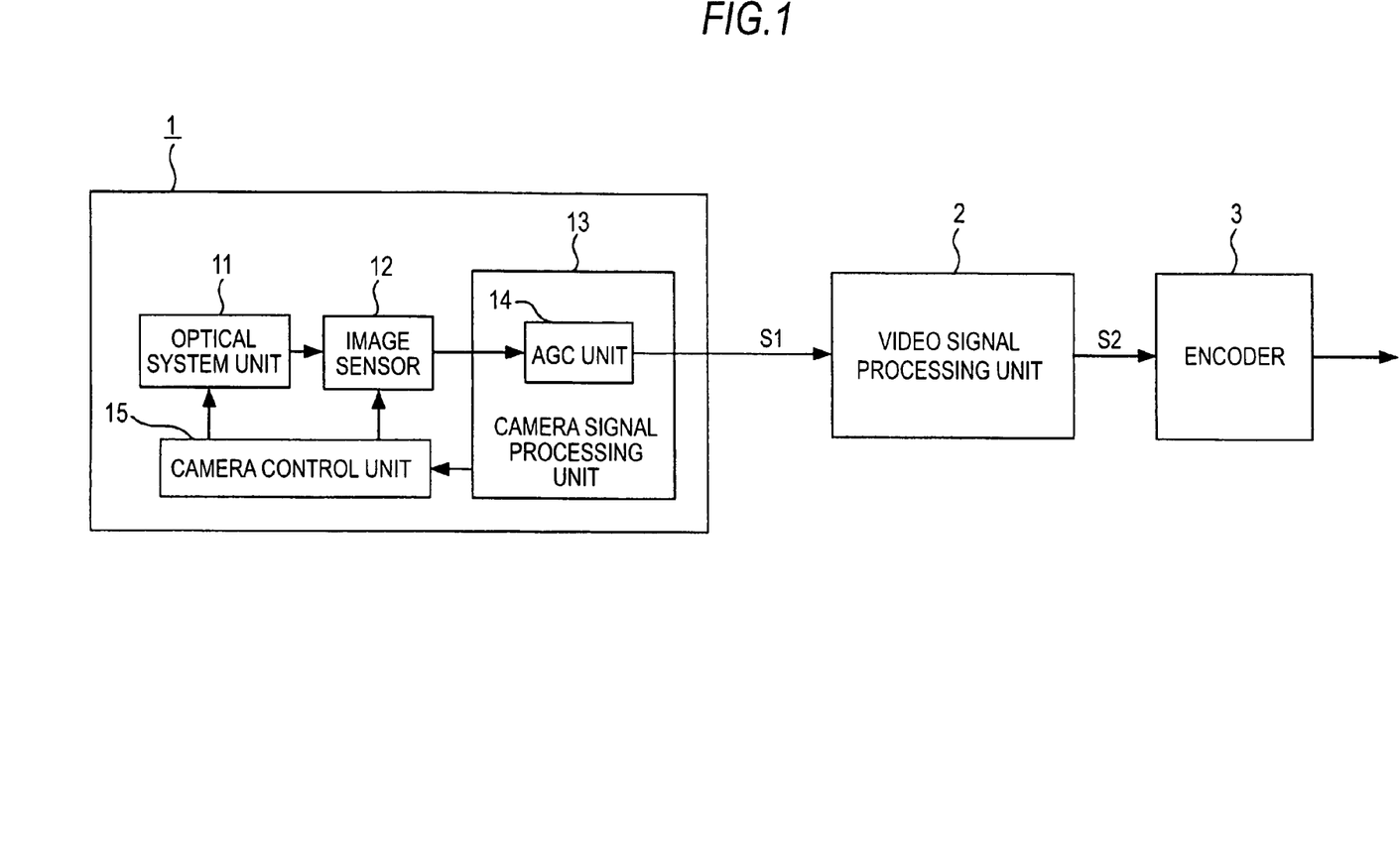
FIG. 1 is a diagram showing an example of the configuration of an image pickup system corresponding to an embodiment of the invention.

FIG. 1 shows an example of the overall configuration of an image pickup system having a video signal processing unit as an embodiment. The image pickup system shown in this figure has a camera unit 1, a video signal processing unit 2, and an encoder 3.

The camera unit 1 performs imaging. It also generates a video signal S1 as a moving image from imaging light obtained by the imaging, and outputs the video signal.

As illustrated in the figure, the camera unit 1 in this case has an optical system unit 11, an image sensor 12, a camera signal processing unit 13, and a camera control unit 15.

The optical system unit 11 has, for example, a necessary number of lens groups for imaging, including a zoom lens and a focusing lens, a diaphragm, and so forth. It causes the incoming light to focus on a light receptive surface of the image sensor 12 as imaging light.

In addition, the optical system unit 11 also has drive mechanism units for driving the zoom lens, the focusing lens, the diaphragm, and so forth. These mechanism units are driven according to what is called camera control, such as zooming (field of view) control, automatic focusing control, and automatic exposure control, which are considered to be performed by the camera control unit 15.

The image sensor 12 performs what is called photoelectric conversion, in which the imaging light obtained by the optical system unit 11 is converted into electric signal. For this purpose, the image sensor 12 is configured to receive the imaging light from the optical system unit 11 onto a light receptive surface of a photoelectric conversion element, and to output signal electric charge accumulated according to the intensity of the received light successively at predetermined timing. Thereby, an electric signal (image signal) corresponding to the imaging light is output.

It should be noted that the photoelectric conversion element (image sensor element) employed as the image sensor 12 is not particularly limited, and examples in the current state of the art include CMOS (Complementary Metal Oxide Semiconductor) sensors and CCDs (Charge Coupled Devices).

The image signal that is output from the image sensor 12 is input to the camera signal processing unit 13. The camera signal processing unit 13 generates a video signal S1 in a digital format from the input image signal, performs predetermined signal processing thereto, and outputs it to outside of the camera unit 1.

An AGC (Auto Gain Control) unit 14 is shown as the camera signal processing unit 13 in this case. This means that at least an auto gain control process is performed as the signal processing performed by the camera signal processing unit 13. This automatic gain control is a process in which, when the brightness (signal level) of the input imaging video signal is high or low, the signal is amplified with a gain such that the brightness becomes an optimum value. In other words, correction regarding the gain and brightness of the video signal is performed.

It should be noted that the configuration for the above-described automatic gain control executed by the AGC unit 14 is not particularly limited, and, for example, a known configuration to date may be employed.

In this case, the video signal S1 that is output from the camera signal processing unit 13 is allowed to be input to the video signal processing unit 2.

The video signal processing unit 2 performs noise removal and digital video signal processing for brightness correction for the input video signal S1, as will be described later, and outputs the processed signal as a video signal S2 in a digital format. The video signal S2 is output to the encoder 3.

The encoder 3 performs a compression coding process that is compliant with a predetermined scheme for the input video signal S2, and outputs the signal as a compression coded video signal in a predetermined format.

It should be noted that the compression coded video signal that is output from the encoder 3 is output to an appropriate downstream circuit, apparatus, or the like.

As one example, in the case where the image pickup system shown in FIG. 1 is a video conference system terminal that takes images of participants of the conference, the compression coded video signal that is output from the encoder 3 is transmitted to a video conference system terminal of a partner (far end side) through a communication circuit system. The far end side video conference system terminal receives the compression coded video signal, performs a decoding process compatible with the compression coding, and, for example, displays it as an image by a display device.

The whole or part of the functions of the video signal processing system shown in FIG. 1 such as the video signal processing unit 2 and the encoder 3 may be implemented by a DSP (Digital Signal Processor). In other words, the process can be realized by making the DSP execute an instruction (program).

<2. An Example of the Basic Configuration of a Video Signal Processing Unit that Forms the Basis of the Embodiment>

Figure 2:
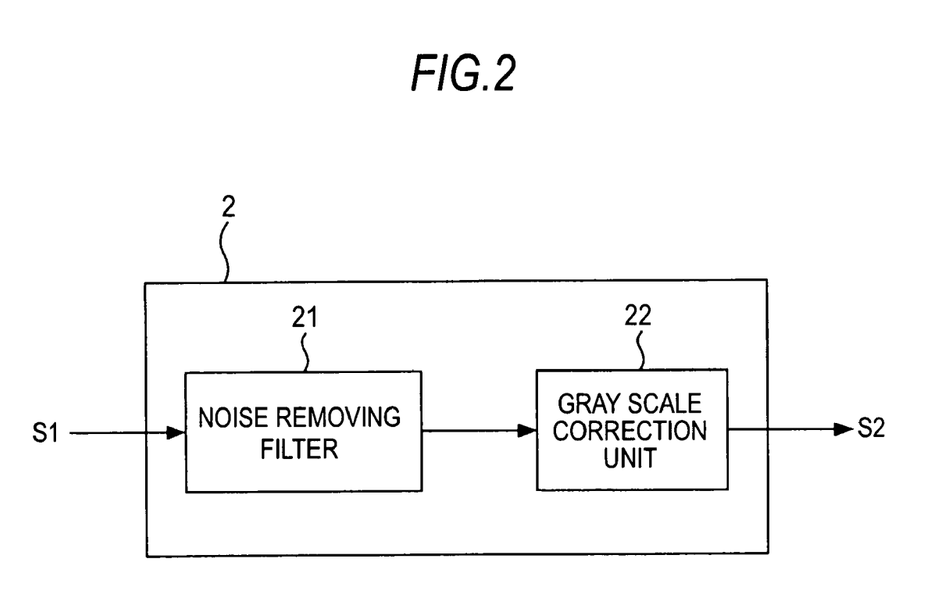
FIG. 2 is a diagram showing an example of a basic configuration that can be adopted as a video signal processing unit of the image pickup system.

FIG. 2 shows a basic configuration that can be adopted as the video signal processing unit 2.

The video signal processing unit 2 shown in this figure includes a noise removing filter 21 and a gray scale correction unit 22.

The noise removing filter 21 receives the video signal S1 that is output from the camera unit 1, removes noise therefrom, and output the signal. For example, the noise removing filter 21 is configured to perform what is called a noise removing process along a space axis and a noise removing process along a time axis, for the video signal. The noise removing process along the space axis refers to, for example, a process for removing the noise in the image space for each frame image. The noise removing process along the time axis refers to a process for removing the noise that occurs between the successive frames in terms of time. It should be noted that known techniques, for example, may be adopted for the configuration of such a noise removing filter 21.

The video signal from which noise has been removed by the noise removing filter 21 is output to the gray scale correction unit 22. In this case, the video signal that is output from the gray scale correction unit 22 becomes the video signal S2, which is an input video signal to the encoder 3.

The gray scale correction unit 22 performs gray scale correction for the video signal that is input from the noise removing filter 21.

For example, a correction characteristic (tone curve) with a gray scale value that results in an optimum brightness is generated for each pixel of the video signal of the current frame based on the result of the analysis carried out for the video signal of one previous frame. Thereby, for example, a tone curve that increases the gray scale is generated for a pixel that is determined to have a low gray scale (brightness), whereas a tone curve that decreases the gray scale is generated for a pixel that is determined to have a high gray scale. Then, according to these tone curves, gray scale correction is performed pixel by pixel.

An example of the configuration of such a gray scale correction is Brightface (registered trademark).

It is possible to employ a signal processing function that is implemented in the image pickup system of a video conference system or the like as the signal processing function.

In general, an image pickup apparatus performs an adjustment by a diaphragm or AGC such that the brightness of the imaging video signal (gray scale, luminance) becomes optimum against the illuminance of the imaging environment. However, the adjustment may not work well in some cases under a condition in which the contrast within the screen is extreme. Examples of such a condition include a case in which the subject is dark while the background is bright because of a backlight condition, and a case in which an image projected by a projector or the like is taken in a dark conference room. In such conditions, if the brightness is adjusted so as to adapt to a bright image area, a dark image area becomes deep black, and what is called black-out, in which the image cannot be recognized, tends to occur. On the other hand, if the brightness is adjusted so as to adapt to a dark image area, a bright image area becomes pure white, and what is called white-out, in which the image cannot be recognized, tends to occur.

When the gray scale correction as described above is performed by the gray scale correction unit 22, the brightness in the dark portion is raised while the brightness in the excessively bright portion is suppressed, for example, in the image obtained by the video signal after the correction. In other words, an image with good viewability that shows no black-out or white-out can be obtained even for an image originally having a large contrast.

In the configuration shown in FIG. 1, the AGC unit 14 is provided in the camera unit 1, and thereby the gain given to the video signal is made variable. However, as is well known, when the gain given to the video signal is higher, high frequency noise tends to occur more easily. In the AGC process, this tendency becomes more noticeable when the brightness of the original video signal is lower. This is because, if the brightness of the video signal is low, the signal is amplified with a correspondingly high gain.

For this reason, the video signal processing unit 2 is required to remove the noise generated by the gain control by the AGC unit 14 effectively.

In other words, when the brightness of the imaging video signal is lower and the gain set by the AGC unit 14 is higher, for example, the amount of noise of the video signal S1 that is generated due to the gain increase becomes greater. Therefore, the strength of the noise removal should be made higher corresponding to the increase of the gain set by the AGC unit 14.

On the other hand, when the brightness of the imaging video signal is higher and the gain given by the AGC unit 14 is lower, the amount of noise of the video signal S1 that is generated due to the gain increase becomes less. If the strength of the noise removal remains high, the high frequency portion of the video signal is attenuated more than necessary, and the image appears out-of-focus. Therefore, the strength of the noise removal by the noise removing filter 21 should be made lower corresponding to the decrease of the gain set by the AGC unit 14.

It is preferable that the noise removing filter 21 appropriately perform a change of the strength adapted to the gain setting of the AGC unit 14 such as described above.

However, with the configuration shown in FIG. 2, for example, it is difficult to perform a noise removal operation adapted to the gain control of the AGC unit 14 such as described above. This is because, in a combination of the configurations shown in FIG. 1 and FIG. 2, the video signal from the camera unit 1 that has been subjected to automatic gain control is simply input to the noise removing filter 21, and after the signal has been input thereto, merely a noise removing process is executed according to a predetermined algorithm.

In reality, the image pickup system with the structure shown in FIG. 1 may be manufactured in some cases by employing the process of obtaining one completed device component as the camera unit 1 and adding signal processing components, such as the video signal processing unit 2 and the encoder 3, thereto.

In such a case, the foregoing problem arises naturally when employing the configuration in which a component as the video signal processing unit 2 shown in FIG. 2 is merely connected to a component as the camera unit 1.

One possible solution is to employ a technique as follows. The brightness of the video signal S1 is detected in the noise removing filter 21, and the gain set by the AGC unit 14 is estimated from the detected brightness. Then, the strength of the noise removal is set accordingly.

However, with this technique, it is difficult to set an appropriate strength of noise removal. In reality, a necessary strength may not be set, and noise in the signal may be left unremoved. Or an excessive strength may be set, and as a result, unnecessarily blurred afterimage tends to remain.

In view of this, in this embodiment, the video signal processing unit 2 is configured in the manner described below, and as a result, it is made possible to perform noise removal adapted to the result of the gain control by the AGC.

<3. An Example of the Configuration of the Video Signal Processing Unit as an Embodiment>

Figure 3:
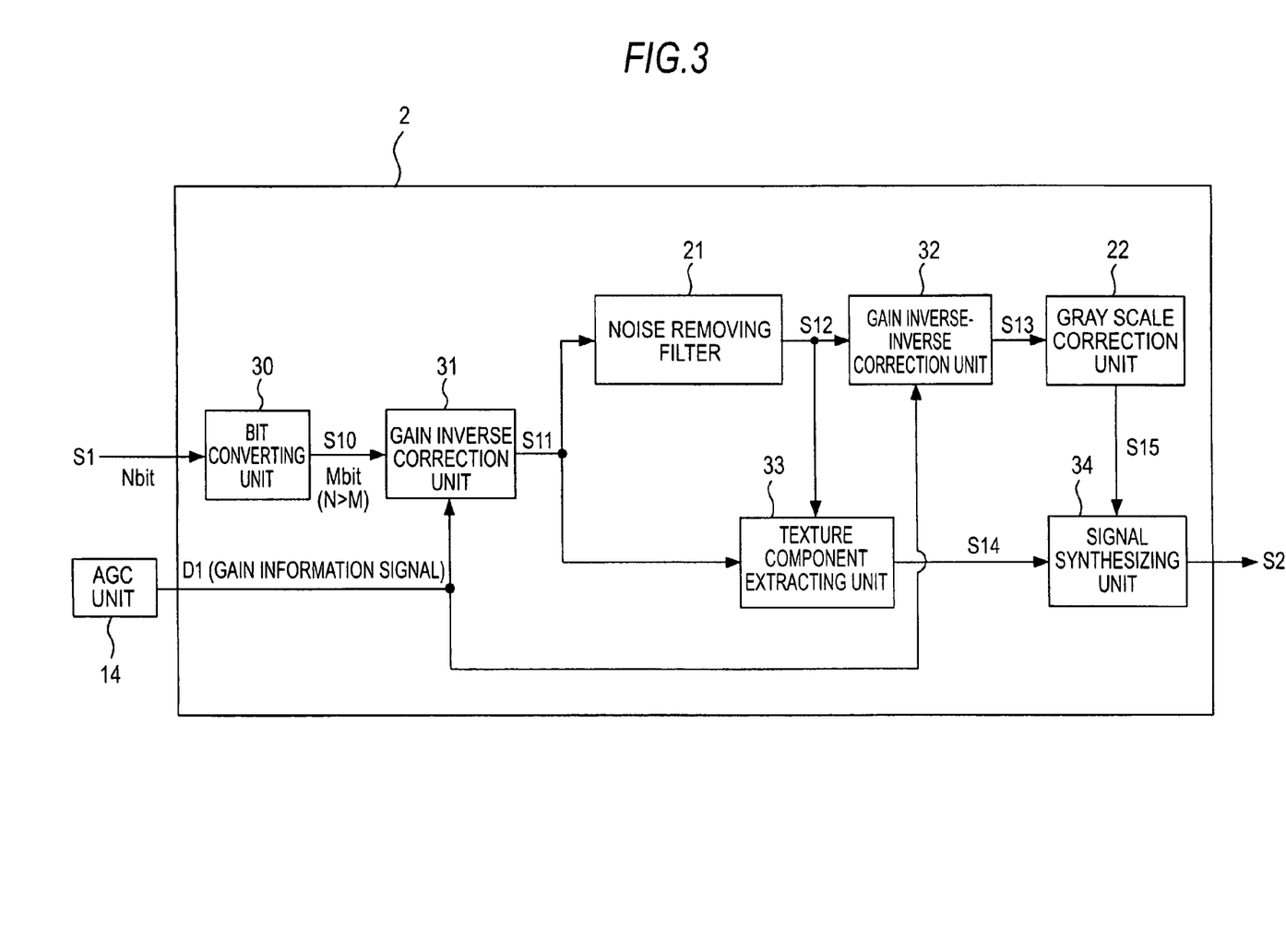
FIG. 3 is a diagram showing an example of the configuration of a video signal processing unit as one embodiment of the invention.

FIG. 3 shows an example of the configuration of a video signal processing unit 2 as one embodiment of the invention.

The video signal processing unit 2 of this embodiment shown in this figure has a bit converting unit 30, a gain inverse correction unit 31, a gain inverse-inverse correction unit 32, a texture component extracting unit 33, and a signal synthesizing unit 34, in addition to the noise removing filter 21 and the gray scale correction unit 22 shown in FIG. 2.

Moreover, in this embodiment, gain information signal D1 is output from the AGC unit 14 of the camera unit 1, and the gain information signal D1 is input to the video signal processing unit 2, as shown in FIG. 3. This gain information signal D1 is branched and input to the gain inverse correction unit 31 and the gain inverse-inverse correction unit 32 in the video signal processing unit 2.

The gain information signal D1 indicates, for example, a set (corrected) gain value. It should be noted that the gain value here is represented in unit of dB.

It should be noted for the purpose of confirmation that the configuration of the image pickup system provided with the video signal processing unit 2 of this embodiment may be the same as that shown in FIG. 1 except that the gain information signal D1 is input from the AGC unit 14 of the camera unit 1 to the video signal processing unit 2 as described above.

Referring to FIG. 3, the video signal S1 that is output from the camera unit 1 is first input to the bit converting unit 30. The bit converting unit 30 converts the bit number M of the video signal S1 to a bit number N, which is greater than the bit number M, and outputs it as a video signal S10.

In the gain inverse correction unit 31, for example, the brightness of the video signal is reduced by its inverse correction process. However, by performing the bit conversion as described above and increasing the number of bits of the video signal, the information content of the video signal is maintained as much as possible. Thereby, high image quality is achieved.

The video signal S10 is input to the gain inverse correction unit 31. The gain information signal D1 is also input to the gain inverse correction unit 31, as described above.

The gain inverse correction unit 31 recognizes the gain value set by the AGC unit 14 from the gain information signal D1. Then, the gain inverse correction unit 31 sets a gain for the input video signal S10 according to a correction characteristic that is inverse to the correction characteristic corresponding to the gain value set by the AGC unit 14 (inverse correction).

Figure 4:
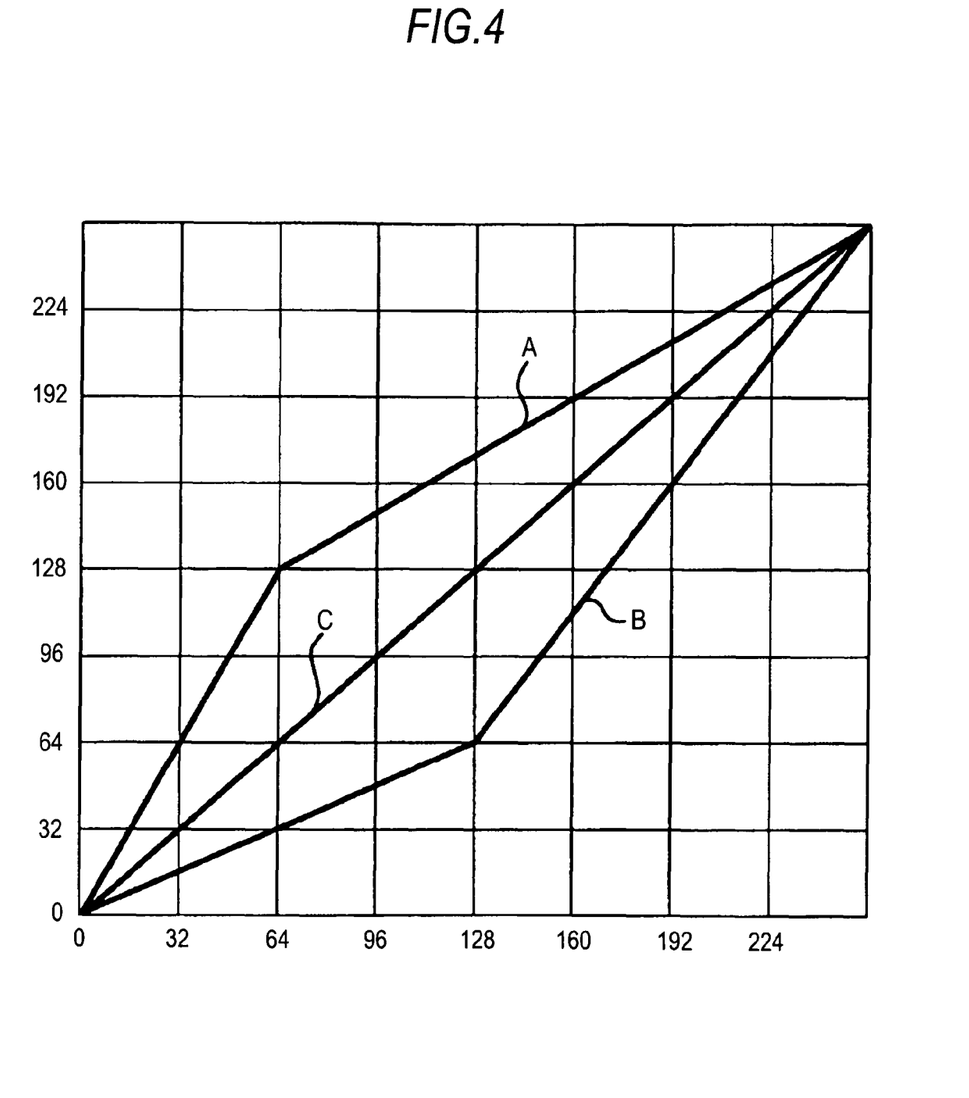
FIG. 4 is a graph showing gain (brightness) correction characteristics relating to an embodiment of the invention.

FIG. 4 shows correction characteristics A, B, and C. In FIG. 4, the horizontal axis represents the brightness value of the input video signal (video signal before the gain setting (i.e., correction)), and the vertical axis represents the brightness value of the output video signal (video signal after the gain setting (i.e., correction)).

Here, it is assumed that the correction characteristic that is obtained corresponding to the gain set by the AGC unit 14 is a correction characteristic A. In this case, the gain inverse correction unit 31 sets a gain corresponding to a correction characteristic B for the video signal S10. Here, the gain characteristics A and B are inverse characteristics to each other. Thus, the gain inverse correction unit 31 performs the above-described inverse correction.

By the inverse correction performed in this way, the brightness (luminance) of the video signal is made almost the same level as that before the correction by the AGC unit 14. In addition, the noise is accordingly suppressed to almost the same level as that before the correction by the AGC unit 14.

A video signal S11 to which the above-described inverse characteristic is provided by the gain inverse correction unit 31 is branched and input to the noise removing filter 21 and the texture component extracting unit 33.

The noise removing filter 21 executes a process of removing noise (texture component) from the video signal S11. Then, the signal is branched and output to the gain inverse-inverse correction unit 32 and the texture component extracting unit 33.

The texture component extracting unit 33 receives the video signals S11 and S12. It executes a process of, for example, removing (subtracting) the component of the video signal S12 from the video signal S11, and outputs the signal as a video signal S14.

Here, the video signal S12 is a video signal obtained by removing noise from the video signal S11. Accordingly, a signal that contains only the noise component contained in the video signal S11 is obtained as the video signal S14. In this embodiment, this video signal S14 as the noise component is handled as a texture component. On the other hand, the video signal from which noise has been removed by the noise removing filter 21 is handled as a structure component.

That is, the video signal S11 is separated into a structure component signal and a texture component signal by the noise removing filter 21 and the texture component extracting unit 33. Moreover, in this case, the texture component is high frequency noise generated by the AGC, so the texture component can be regarded as a high frequency component of the video signal. On the other hand, the structure component can be regarded as a low frequency component of the same video signal.

The gain inverse-inverse correction unit 32 sets a gain for the input video signal S12 as the texture component that corresponds to a correction characteristic that is inverse to the correction characteristic corresponding to the gain set by the gain inverse correction unit 31 (i.e., an inverse-inverse correction characteristic). Specifically, referring to FIG. 4, the gain corresponding to the correction characteristic A is set.

Thereby, the brightness (luminance) of the video signal S13 that is output from the gain inverse-inverse correction unit 32 is rendered back to the same brightness (luminance) of the video signal S11 after the correction by the AGC unit 14. However, the gain inverse-inverse correction unit 32 performs correction for the video signal S12 from which noise has been removed by the upstream noise removing filter 21. Therefore, although the video signal S13 has the same brightness as the video signal S11, the noise is suppressed in comparison with the video signal S11.

It should be noted that the gain inverse-inverse correction unit 32 sets the inverse-inverse correction characteristic and a gain value corresponding thereto, utilizing the gain information signal D1 that is directly input thereto. However, the inverse-inverse correction characteristic and the gain value may be set, for example, based on the inverse characteristic and the gain value set by the gain inverse correction unit 31. In this case, the inverse-inverse correction characteristic and the gain value are set utilizing the gain information signal D1 indirectly.

The gray scale correction unit 22 receives the video signal S13 and executes a process of brightness correction as described above. Then, it outputs the signal as a video signal S15.

The signal synthesizing unit 34 synthesizes the video signal S15 from the gray scale correction unit 22 and the video signal S14 that is output from the texture component extracting unit 33, and outputs the synthesized signal. In other words, it resynthesizes the texture component and the structure component of the video signal, which once has been separated. The resynthesized signal is output to the encoder 3 as the video signal S2 in this case.

As will be understood from the foregoing description, first, noise is significantly reduced from the resulting video signal S2 that is output from the signal synthesizing unit 34 when a video signal S1 based on an imaging video signal with a low brightness (dark image) is input to the video signal processing unit 2 of this embodiment. In other words, although the video signal S1 in this case has a considerable amount of noise (texture component) because a high gain is set by the AGC unit 14, the noise is effectively cut from the video signal S2.

This operation means that as the noise removing function of the video signal processing unit 2, a strong noise removing process is performed in the condition in which a video signal amplified with a high gain by the AGC is input because the video signal originally has a low brightness.

It should be noted that in the signal synthesizing unit 34, the video signal S14, which is a noise (texture) component, is synthesized with the video signal S14, which is a structure component. However, this does not particularly cause a problem because the noise component as the video signal S14 corresponds to the amount of the noise superimposed over the video signal S11 that is output from the gain inverse correction unit 31, which is very small in comparison with the noise superimposed over the video signal S1.

On the other hand, when the imaging video signal that is the basis of the video signal S1 has a higher brightness (brighter image), the video signal processing unit 2 performs a weaker noise removing process as a result. Specifically, the video signal S2 in which the high frequency portion is not attenuated excessively and that shows a clear image can be obtained.

As a most evident example, it is assumed that the AGC unit 14 did not change the gain, i.e., the gain value=0 dB, for example, and outputs the video signal S1, because the brightness of the imaging video signal is sufficient to more than a certain level.

According to this, the gain inverse correction unit 31 finds the correction characteristic C shown in FIG. 4. This means that substantially no inverse correction is performed. Accordingly, the gain inverse correction unit 31 in this case as well sets a gain value=0 dB for the video signal S10, and outputs the video signal S11.

It should be noted for the purpose of confirmation that the video signal S1 in this case is not corrected by the AGC unit 14. Therefore, the video signal S10 contains almost no noise originating from the amplification by the AGC unit 14. Accordingly, the amount of the noise superimposed on the video signal S11 is already small.

Then, noise is first removed from the video signal S11 by the noise removing filter 21 and only the structure component is extracted. Thereafter, the video signal is input to the gain inverse-inverse correction unit 32. The gain inverse-inverse correction unit 32 at this time also sets a gain value=0 dB according to the correction characteristic C for the video signal S12 and outputs the video signal S13. In other words, substantially no inverse-inverse correction is performed here either. Next, the video signal S13 is subjected to brightness correction by the gray scale correction unit 22, and is input to the signal synthesizing unit 34 as the video signal S15.

Then, the signal synthesizing unit 34 synthesizes the video signal S15, which is the structure component, and the video signal S14, which is the texture component from the texture component extracting unit 33, and outputs the synthesized signal as the video signal S2.

In such a operation, first, the gain inverse correction unit 31 and the gain inverse-inverse correction unit 32 in the video signal processing unit 2 does not perform substantial inverse correction or inverse-inverse correction. In addition, the noise generated by the AGC is not superimposed on the video signal S11 in this case, so the noise removing filter 21 also ideally outputs the same video signal S12 as the video signal S11. Accordingly, the video signal S2 that is output from the signal synthesizing unit 34 in this case is one in which only the brightness correction by the gray scale correction unit 22 is performed for the video signal S1 (S10). In other words, it may be seen that the video signal processing unit 2 is operating so as not to perform noise removal, as described above.

However, in reality, the noise removing filter 21 performs the noise removal process for the video signal input excessively to a certain degree in some cases. In this case, when a video signal containing little noise is input, the high frequency portion is reduced more than necessary, resulting in a somewhat blurred image.

As a solution to this problem, the texture component (the video signal S14) is resynthesized with the structure component (the video signal S15) by the signal synthesizing unit 34 in this embodiment. The texture component (the video signal S14) is a high frequency component of the video signal. Therefore, when the texture component (the video signal S14) is synthesized with the structure component (the video signal S15), the high frequency portion of the structure component (the video signal S15) that has been removed or reduced by the noise removing filter 21 is restored. Thereby, the image based on the video signal S2 is prevented from becoming somewhat blurred, and a clear image is obtained.

It should be noted for the purpose of confirmation that the gain inverse correction unit 31 and the gain inverse-inverse correction unit 32 are configured so that each of them can set a correction characteristic (gain value for correction) according to the positive or negative gain value indicated by the gain information signal D1. More specifically, when the gain value set by the AGC unit 14 is 0 dB, the gain value set by the gain inverse correction unit 31 and the gain inverse-inverse correction unit 32 is also 0 dB.

When the positive gain value set by the AGC unit 14 increases, the absolute value of the negative gain value that is set by the gain inverse correction unit 31 increases correspondingly, and the positive gain value that is set by the gain inverse-inverse correction unit 32 also increases correspondingly.

When the negative gain value set by the AGC unit 14 increases, the positive gain value that is set by the gain inverse correction unit 31 increases correspondingly, and the negative gain value that is set by the gain inverse-inverse correction unit 32 also increases correspondingly.

That is, the gain inverse correction unit 31 and the gain inverse-inverse correction unit 32 dynamically variably set the correction characteristic (gain value for correction) in accordance with the gain set by the AGC unit 14.

Thus, in this embodiment, the noise removing function of the video signal processing unit 2 operates in such a manner that the strength of the noise removal is made higher when the brightness of the input video signal (S1) is lower, i.e., when the amplification factor by the AGC is higher, whereas the strength of the noise removal is made lower when the brightness is higher, i.e., when the amplification factor by the AGC is lower. In other words, an appropriate strength of the noise removal can be set in accordance with the brightness variation of the video signal and the strength of the gain correction for the input video signal by the AGC.

This makes it possible to obtain a better image quality than heretofore, irrespective of, for example, the brightness variation of the video signal.

It should be noted that the strength of noise removal is generally represented by, for example, combinations of the cut-off frequency of a low-pass filter and the attenuation factor. In this embodiment, it can be said that the operation corresponding to a change of the cut-off frequency and the attenuation factor is realized by the above-described configuration.

It should be noted that, as described above, the video signal processing unit 2 of this embodiment should desirably make the strength of the noise removing process to the input video signal variable in response to the degree of the AGC. From this point of view, the gray scale correction unit 22 is not necessarily essential. In other words, the gray scale correction unit 22 may be omitted, and in place of the video signal S15, the video signal S13 that is output from the gain inverse-inverse correction unit 32 may be input to the signal synthesizing unit 34.

Alternatively, a portion having a specific video signal processing function other than the gray scale correction unit 22 may be provided downstream of the gain inverse-inverse correction unit 32. Specifically, a signal based on the video signal S13 that is output from the gain inverse-inverse correction unit 32 should preferably be input to the signal synthesizing unit 34 as a structure component signal.

As described above previously, the video signal of the texture component is synthesized with the signal of the structure component by the signal synthesizing unit 34 for the purpose of restoring the high frequency component that may have been impaired by the noise removing filter 21. This effect becomes more effective when the brightness of the input video signal (S1) is higher. In other words, for example, there is a possibility that even a video signal with a structure component can maintain sufficient image quality when the brightness of the input video signal is less than a certain level. Accordingly, it may be possible that, for example, only the structure component video signal is output without synthesizing the texture component video signal (S14) therewith if the video signal processing unit 2 detects the brightness of the input video signal to be less than a certain level.

In addition, in the foregoing embodiment, the video signal processing unit 2 is incorporated in the image pickup system. However, the configuration of this embodiment that corresponds to the video signal processing unit 2 may be applied to other apparatus than the image pickup system.

Specifically, the output source of the input video signal (S1) of the video signal processing unit 2 may be any type of apparatus and circuits that is capable of outputting video signal in general, such as a video recorder, other than the above-described image pickup apparatus. Moreover, any device or a circuit other than the encoder for compression coding may be used for the device or the circuit to which the output video signal from the video signal processing unit 2 is input.

In addition, the embodiment is intended to process video signals, but it is also possible, for example, to process audio signals.

Furthermore, the video signal processing unit 2 of this embodiment may be constructed by a DSP, as described previously. Specifically, a program (instructions) for executing the process described with reference to FIG. 3, for example, is prepared as a program (instructions) executed by the DSP, and written into a storage device of the DSP, such as a ROM. This enables the DSP to perform a function as the video signal processing unit 2 of this embodiment.

It is also possible that a program for performing video signal processing as the video signal processing unit 2 of this embodiment is prepared so as to be compatible with a CPU (Central Processing Unit), not the DSP, and the program may be stored in a storage device that the CPU utilizes. Thereby, the video signal processing function of the video signal processing unit 2 of this embodiment can be provided for information process apparatus that has a CPU in general, such as a personal computer.

The just-mentioned program may be stored in a storage device in advance, as described above. Otherwise, it is possible that the program may be stored in a removable storage media, and then it may be stored the foregoing storage device or the like by installing (including updating) the program from the storage media. Furthermore, it is considered possible to install the program by control from other host equipment via a data interface. Moreover, it is conceivable that the program may be stored in a storage device of a server or the like on a network, and then, the program may be acquired by downloading it from the server via a network, for example.

In addition, the video signal processing unit 2 is configured to perform the video signal processing by digital signal processing in the above-described embodiment, it is also possible to employ a configuration in which the video signal processing is realized by analog signal processing.

The present application contains subject matter related to that disclosed in Japanese Priority Patent Application JP 2008-201009 filed in the Japan Patent Office on Aug. 4, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A video signal processing apparatus comprising:
a gain inverse correction means for receiving a video signal having been subjected to automatic gain control and gain information indicating a gain set by the automatic gain control, giving an inverse correction gain resulting in an inverse correction characteristic to the gain indicated by the gain information to the received video signal and outputting the video signal;
a texture component removing means for removing a texture component from the video signal that is output from the gain inverse correction means;
a gain inverse-inverse correction means for giving an inverse-inverse correction gain resulting in a correction characteristic that is inverse to the inverse correction gain to the video signal that is output from the texture component removing means;
a texture component extracting means for extracting a texture component signal, utilizing the video signal that is output by the gain inverse correction means and the video signal that is output by the texture component removing means; and
a signal synthesizing means for synthesizing a structure component signal based on the video signal that is output by the gain inverse-inverse correction means and the texture component signal to output a video signal.

2. The video signal processing apparatus as set forth in claim 1, wherein the video signal has a digital format;
the video signal processing apparatus further comprises a bit converting means for converting a bit number N of the video signal subjected to the automatic gain control into a bit number M (M>N) and input the video signal to the gain inverse correction means; and
the gain inverse correction means, the texture component removing means, the gain inverse-inverse correction means, the texture component extracting means, and the signal synthesizing means are configured to execute a process for the video signal having the bit number M.

3. A video signal processing method comprising the steps of:
inverse correcting a gain by receiving a video signal subjected to automatic gain control and gain information indicating a gain set by the automatic gain control, giving an inverse correction gain resulting in an inverse correction characteristic to the gain indicated by the gain information to the received video signal, and outputting the video signal;
removing a texture component from the video signal that is output by the gain inverse correction step;
giving an inverse-inverse correction gain resulting in an inverse correction characteristic to the inverse correction gain to the video signal that is output by the texture component removing step, and outputting a video signal;
extracting a texture component signal utilizing the video signal that is output by the gain inverse correction step and the video signal that is output by the texture component removing step; and
synthesizing a structure component signal based on the video signal that is output by the gain inverse-inverse correction step and the texture component signal to output a video signal.

4. A program stored in a non-transitory computer readable medium for causing a video signal processing apparatus to execute the steps of:
inverse correcting a gain by receiving a video signal subjected to automatic gain control and gain information indicating a gain set by the automatic gain control, and giving an inverse correction gain resulting in an inverse correction characteristic to the gain indicated by the gain information to the received video signal, to output the video signal;
removing a texture component from the video signal that is output by the gain inverse correction step;
giving an inverse-inverse correction gain resulting in an inverse correction characteristic to the inverse correction gain to the video signal that is output by the texture component removing step, to output a video signal;
extracting a texture component signal utilizing the video signal that is output by the gain inverse correction step and the video signal that is output by the texture component removing step; and
synthesizing a structure component signal based on the video signal that is output by the gain inverse-inverse correction step and the texture component signal to output a video signal.

5. A video signal processing apparatus comprising:
a gain inverse correction unit configured to receive a video signal having been subjected to automatic gain control and gain information indicating a gain set by the automatic gain control, and to give an inverse correction gain resulting in an inverse correction characteristic to the gain indicated by the gain information to the received video signal, to output the video signal;
a texture component removing unit configured to remove a texture component from the video signal that is output from the gain inverse correction unit;
a gain inverse-inverse correction unit configured to give an inverse-inverse correction gain resulting in a correction characteristic that is inverse to the inverse correction gain to the video signal that is output from the texture component removing unit;
a texture component extracting unit configured to extract a texture component signal, utilizing the video signal that is output by the gain inverse correction unit and the video signal that is output by the texture component removing unit; and
a signal synthesizing unit configured to synthesizing a structure component signal based on the video signal that is output by the gain inverse-inverse correction unit and the texture component signal to output a video signal.

* * * * *